United States Patent Office 3,314,717
Patented Apr. 18, 1967

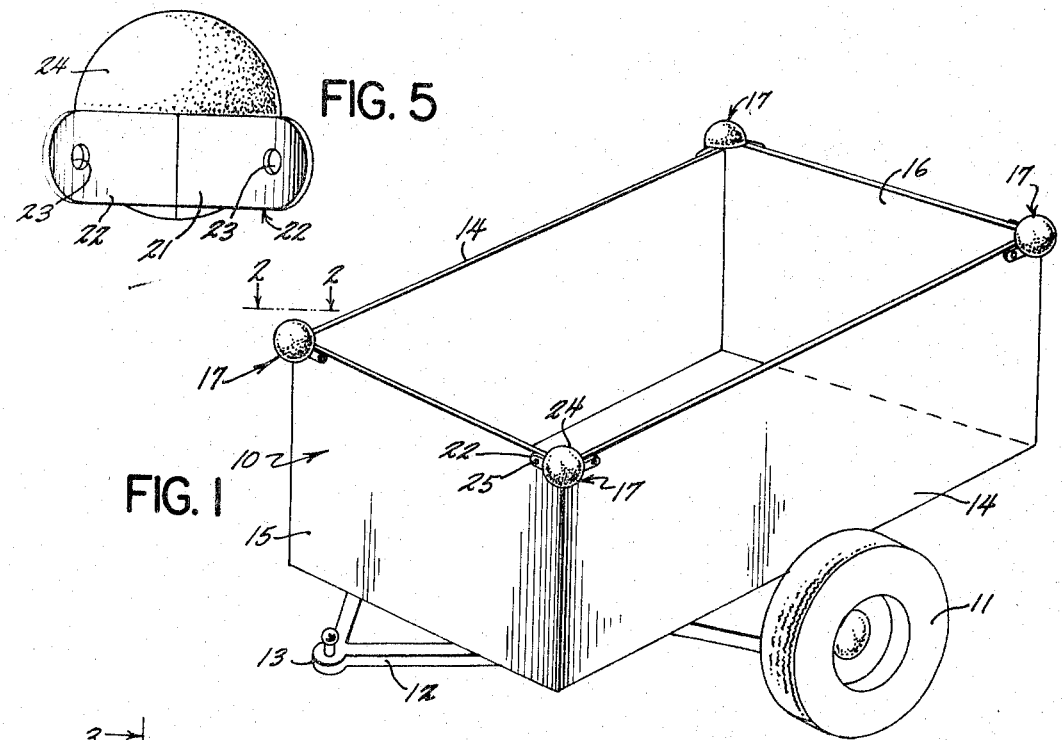
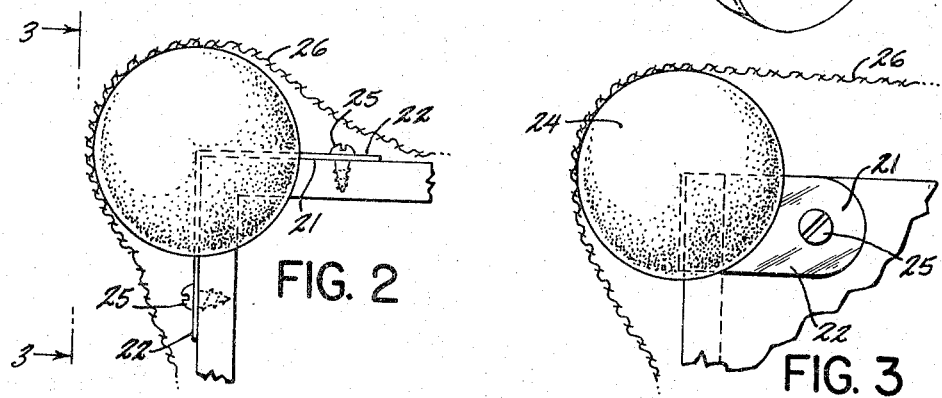
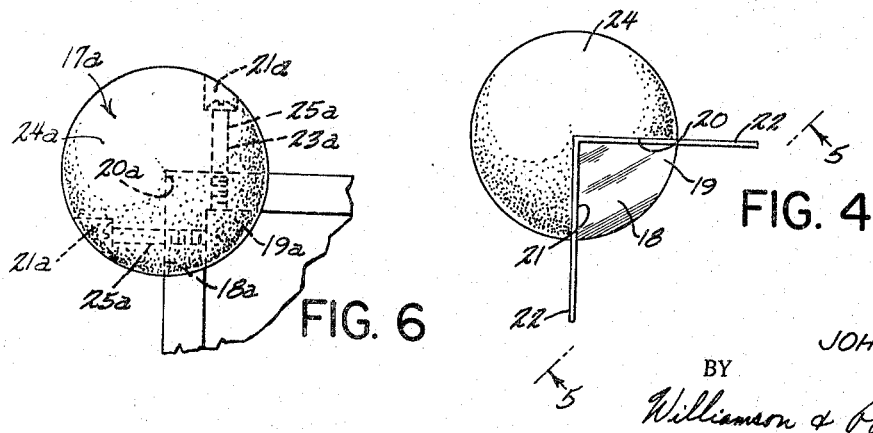

3,314,717
BEARING ATTACHMENT DEVICE
John P. Wild, Park River, N. Dak. 58270
Filed Mar. 5, 1965, Ser. No. 437,358
3 Claims. (Cl. 296—100)

This invention relates to a bearing attachment device for use with vehicle trailer bodies.

One of the problems associated with vehicle truck and trailer bodies of the type that have open tops which are normally closed by canvas covers or tarpaulins, is the rapid wear of those portions of the fabric covers that engage the corners of the vehicle trailer body. The fabric cover normally engages the relatively sharp corners of the vehicle trailer body in snug-fitting relation and when these covers are subjected to movement as the result of air currents as the vehicle trailer body is moved, the cover is stressed at the corner covering portions and wear quickly or are quite often torn. Even when the truck or trailer body is stationary, the wind velocity acting on the tarpaulin or cover is sometimes great enough to stress and cause wear of the corner covering portions of the cover.

It is therefore a general object of this invention to provide a novel bearing attachment device, which is to be applied to the corner of a vehicle trailer body to present thereat a smoothly arcuate resilient yieldable surface that projects upwardly beyond the upper edge of the truck or trailer body and thereby minimizes wear on the trailer body fabric cover in those areas which are normally subjected to the most wear.

A more specific object of this invention is to provide a bearing attachment device for use with vehicle truck or trailer bodies and including a generally spherical member having a substantially quarter-spherical recess therein for application to the upper corner of the vehicle trailer body to form an arcuate support surface for canvas covers and having means for ready but easy attachment to the trailer body.

These and other objects and advantages of the invention will more fully appear from the following description made in connection with the accompanying drawings, wherein like character references refer to the same or similar parts throughout the several views, and in which:

FIG. 1 is a perspective view of a vehicle trailer body to which a plurality of bearing attachment devices have been applied, FIG. 2 is a top plan view on an enlarged scale of the bearing attachment device as it is applied to a corner portion of the vehicle trailer body, FIG. 3 is a side elevational view of the bearing attachment device, FIG. 4 is a bottom plan view thereof, FIG. 5 is a front elevational view thereof, and FIG. 6 is a top plan view similar to FIG. 2 but illustrating a modified form of the bearing attachment device.

Referring now to FIGS. 1 to 5, it will be seen that one embodiment of the bearing attachment is thereshown. It will be seen in FIG. 1 that a plurality of the bearing attachment devices have been applied to a conventional trailer body designated generally by the reference numeral 10 having a pair of ground-engaging wheels 11 and provided with a draw bar or hitch 12 which has a conventional coupler mechanism 13 for connection to the towing vehicle such as an automobile, truck or the like. The trailer body 10 of the type shown is provided with substantially parallel upstanding side walls 14, end walls 15, and a bottom wall, the trailer body having a substantially hollow interior 16 and having an open top.

The vehicle trailer body 10 typifies that type of trailer body that has an open top which is normally closed by flexible fabric cover or tarpaulin formed of canvas or the like for the protection of the material or objects located within the interior of the trailer body. Most of these trailer bodies are of generally rectangular or parallelepiped configuration and have relative sharp corners. When the cover is applied to the trailer body, it is tied down securely in a conventional manner and engages the upper edges and especially the corners in a rather tight-fitting relation. During travel of the trailer body, the air currents produce movement of the cover and this movement in the corner covering portions of the fabric material causes rapid wear as the cover is moved relative to the sharp corners.

Therefore, in order to overcome this problem, bearing attachment devices designated generally by the reference numeral 17 are applied to the corners of the trailer vehicle body as best seen in FIG. 1 to form smooth, resilient bearing surfaces thereat. It will be seen that each of the bearing attachment devices 17 comprises a generally spherically shaped bearing member which is preferably formed of a yieldable resilient material such as rubber, plastic or the like. Each bearing member has a recess 18 formed therein which as seen is of generally quarter-spherical configuration and is formed by three radial planes disposed at right angles to each other and which intersect at approximately the center of the bearing member. It will be seen that the recess defines a substantially flat edge-engaging surface 19 and a pair of wall-engaging surfaces 20 which are also of substantially flat configuration.

Means are provided for attaching the bearing member to the truck body so that the bearing member substantially covers the sharp corners of the vehicle trailer body. It will be seen that this means includes a generally L-shaped bracket 21 preferably formed of a suitable metallic material and having legs 22. The bracket 21 is positioned within the recess 18 so that one surface of each of the legs 22 engages one of the surfaces 20 while one of the respective edges of the legs engage the edge-engaging surface 19.

The bracket 21 may be embedded in the bearing member, for example, during a molding operation or may be secured thereto by any suitable bonding or adhesive material such as glue or the like. It is pointed out that in the event that the bearing member is formed of a yieldable resilient plastic material, a suitable plastic cement or plasticizer may be used.

The outer ends of the bracket legs 22 are apertured as at 23 to receive bolts or screws 25 therethrough, the latter engaging adjacent end and side walls of the trailer body so that the bearing member substantially covers the upper and exterior surfaces of one of the corners of the vehicle trailer body. Thus, it will be seen that the bearing member presents an arcuate outer bearing support surface 24 which projects upwardly and outwardly beyond the confines of the vehicle trailer body and forms a support for the canvas cover in the corner area of the vehicle trailer body.

It will be noted that when the bearing member is applied to a corner of the vehicle trailer body, the corner structure is received within the recess 18 so that the surfaces 20 or the bracket legs associated therewith engage the outer surface of the associated end and side walls of the vehicle trailer body while the edge-engaging surface 19 is positioned against the upper edges of the adjacent end and side walls of the trailer body. The bolts or screws 25 may be readily attached to the trailer body and such attachment devices provide smooth arcuate supporting surfaces for the conventional fabric cover at the points where most of the wear occurs.

It will be seen from examination of FIGS. 2, 3 and 4 that a canvas cover 26 when applied to the trailer body will engage the arcuate bearing surface 24 presented by each of the bearing members at the corner areas of the trailer body and will minimize wear of the fabric cover in these areas. Not only is the bearing member of smooth, arcuate configuration, but the yieldable resilient material from which they are formed permits tight cinching of the cover without any danger of ripping or tearing in the corner areas. Therefore, when the canvas or fabric cover is subjected to movement as a result of air currents during travel of the vehicle trailer body, the cover will bear against a smooth, arcuate, yieldable, resilient surface.

Referring now to FIG. 6, it will be seen that a modified form of a bearing attachment device is thereshown. This bearing attachment device is designated generally by the reference numeral 17a. It is also comprised of a generally spherical shaped bearing element which is preferably formed of a yieldable resilient material such as rubber, plastic or the like. The spherical shaped bearing member has a recess 18a formed therein which is of substantially identical configuration to the quarter-spherical configuration of the spherical members shown in FIGS. 1 to 5. Thus, the recess 18a is defined by three radial planes disposed at right angles to each other which intersect at approximately the center of the bearing member and which defines a substantially flat, edge-engaging surface 19a and wall-engaging surfaces 20a.

The bearing member is also provided with a pair of recesses 21a spaced from each other, each defining a substantially flat surface 21b which has an aperture 23a therein that communicates with the recess 18a. It will be noted that the longitudinal axis of the apertures 23a are disposed at substantially right angles to each other and each accommodates a bolt or screw 25a therethrough to permit attachment of the spherical member to the upper corner of the trailer body. It will be noted that the head of the bolts 25a bears against the subtsantially flat surfaces 21b formed by the recess 21a. The bearing attachment illustrated in FIG. 6 also presents a subtsantially arcuate, continuously smooth bearing surface 24a in the manner of the embodiments of FIGS. 1 to 5. It is also pointed out that the recesses 21a and apertures associated therewith may be omitted and the bearing member may be glued or secured to the corner of the truck or trailer body by any suitable adhesive material.

It is also pointed out that the bearing attachment device 17a is applied to the trailer body and provides a yieldable resilient bearing surface for the flexible cover for the trailer body in the manner of the embodiment of FIGS. 1 to 5.

It will therefore be seen that I have provided the novel bearing attachment device which may be applied to the corner of the conventional vehicle trailer body to provide a smooth, arcuate, resilient, yieldable support for supporting a flexible cover or tarpaulin normally associated with such trailer bodies.

It will further be seen that my novel bearing attachment device may be formed from a yieldable resilient material such as rubber, plastic or the like and can therefore be inexpensively produced.

Thus, it will be seen that I have provided a novel and improved bearing attachment device for use with trailer bodies, which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What is claimed is:

1. A bearing attachment device for use with open top vehicles such as trailer bodies which are closed by flexible covers, said device comprising,
 a substantially spherically shaped bearing member formed of a yieldable, resilient material,
 said bearing member having a quarter-spherical positioning recess therein defined by three radial planes disposed at substantially right angles to each other and intersecting each other at approximately the center of the spherical member, said recess presenting three substantially flat surfaces, said bearing member being positionable upon the upper corner of the vehicle trailer body whereby the exterior wall surfaces of the corner of the trailer body are engaged by two of said recessed flat surfaces and the adjacent upper edge of the corner of the trailer body is engaged by the other of said recessed surfaces,
 attachment means on said bearing member connectible to the trailer body whereby said bearing member presents a smoothly curved, yieldable, resilient surface at the corner of the vehicle trailer body and projects thereabove to be engaged by the flexible cover which is applied to and closes the top of the trailer body and thereby minimizes wear of the flexible cover at the corner areas.

2. A bearing attachment device for use with open top vehicles such as trailer bodies of the type having the open top closed by a flexible cover, said device comprising
 a substantially spherically shaped bearing member formed of a yieldable, resilient material,
 said bearing member having a quarter-spherical positioning recess therein defined by three radial planes disposed in substantially right angular relationship with each other and intersecting at approximately the center of the spherical bearing member, said recess presenting three substantially flat surfaces, said bearing member being positionable upon the upper corner of a vehicle trailer body whereby the exterior wall surfaces of the corner of the trailer body is engaged by two of said recessed flat surfaces and the adjacent upper edge of the corner of the trailer body is engaged by the other of said flat recessed surfaces,
 a bracket member having a pair of elongate apertured legs affixed to a pair of said recessed surfaces and projecting outwardly therefrom,
 and connecting elements extending through said apertured bracket legs for securing the bearing member to the trailer body whereby said bearing member presents a smoothly curved, yieldable, resilient surface at the corner of the vehicle trailer body and projecting thereabove to be engaged by the flexible cover which is applied to and closes the top of the trailer body and thereby minimizes wear of the flexible cover at the corner areas.

3. A bearing attachment device for use with open top vehicles such as trailer bodies which are covered by flexible covers applied to the top of the trailer body, said device comprising,
 a substantially spherically shaped bearing member formed of a yieldable, resilient material,
 said bearing member having a quarter-spherical positioning recess therein defined by three radial planes disposed at substantially right angles to each other and intersecting each other at approximately the center of the spherical member, said recess presenting three substantially flat surfaces, said bearing member being positionable upon the upper corner of the vehicle trailer body whereby the exterior wall surfaces of the corner of the trailer body are engaged by two of said recessed flat surfaces and the adjacent upper edge of the corner of the trailer body is engaged by the other of said recessed surfaces,
 said bearing member having at least a pair of recesses therein spaced from and substantially smaller in size than said positioning recess, and each of said smaller recesses defining a flat bearing surface,
 a pair of apertures in said bearing member disposed in substantially right angular relationship to each other, and each aperture extending between and through one of said last mentioned bearing surfaces and one of said first mentioned flat recessed surfaces, and a pair of connecting elements each extending through one of said apertures for securing said bearing member through the trailer body whereby said bearing member presents the smoothly curved, yieldable, resilient surface at the corner of the vehicle trailer body and projects thereabove to be engaged by the flexible cover which is applied to and closes the top of the trailer body and thereby minimizes wear of the flexible cover at the corner areas.

References Cited by the Examiner
UNITED STATES PATENTS

| | | | |
|---|---|---|---|
| 1,294,148 | 2/1919 | Oliver | 296—107 |
| 3,051,524 | 8/1962 | Palmer | 296—100 |

BENJAMIN HERSH, *Primary Examiner.*

C. C. PARSONS, *Assistant Examiner.*